Patented Aug. 9, 1949

2,478,266

UNITED STATES PATENT OFFICE 2,478,266

FRUIT AND VEGETABLE PRODUCTS AND PROCESS OF MAKING SAME

George O. Hall, Murrysville, Pa., assignor to Hall Laboratories, Inc., Pittsburgh, Pa., a corporation of Pennsylvania No Drawing. Application June 26, 1945, Serial No. 601,711

23 Claims. (Cl. 99—154)

1

This invention relates generally to a method for improving processed red fruits and certain fruit products deriving their red color from the carry-over of naturally occurring red pigments, and to improved fruit products. More specifically, it relates to the color stabilization of such fruits as tomatoes (which are treated as fruit throughout this description), red berry products, cherry products, and jellies and preserves which obtain their red color from parts of red fruits used in the cooking operation to provide color.

By the practice of my invention, improvement of the various products is apparent in several respects. All products treated by my method show an improved retention of natural red color and an inhibition of the darkening of the products. When I treat tomatoes, which are pulped for the manufacture of catsup and chili sauce, there is also an increased yield of puree and a reduction of cooking time. In the treatment of jams, preserves, and jellies, I find that improved gel strength is obtained by my method.

I have found that by the addition of certain molecularly dehydrated phosphates to these various fruit products, the general improvements I have enumerated are made possible.

By the term "molecularly dehydrated phosphates," I mean phosphates which may be considered as derived from phosphoric acids poorer in water than orthophosphoric acid. Included among the molecularly dehydrated phosphates are the crystalline pyrophosphates, acid pyrophosphates, tripolyphosphates, and metaphosphates. Also included are the phosphate glasses which may be prepared over a wide range of composition with molar ratios of $M_2O$ to $P_2O_5$ from the value of 0 corresponding to glassy $P_2O_5$ up to the value of about 1.7 approximating the overall composition of tripolyphosphate. The expression $M_2O$ represents total alkalimetal oxide and is intended to represent mixtures of alkali-metal oxides as well as single alkali-metal oxides.

The ratio of $M_2O:P_2O_5$ for the molecularly dehydrated phosphates ranges from 0 to 2:1. I prefer glassy phosphates having a ratio of $M_2O:P_2O_5$ in the range from 0.8:1 to about 1.7:1, because these glasses may be manufactured with less difficulty than those in the lower ratios. I have found also that compositions having a ratio of $M_2O:P_2O_5$ within the range of about 0.4:1 to 1:1 are very effective in my process, and this is true of crystalline as well as glassy phosphates within this range.

Among the crystalline metaphosphates which may be used in my process, the water-soluble tri-

2 metaphosphates produce the desired effect only after conversion into tripolyphosphate, which may occur under the conditions of pH and temperature during use. The substantially water-insoluble forms known as Maddrell salt or Kurrol salt are satisfactory since they will go into solution naturally under the conditions of use or may be made to do so conveniently by the addition of suitable substances. For example, insoluble crystalline potassium metaphosphate (Kurrol salt) is solubilized by interaction with sodium ion. Insoluble crystalline sodium metaphosphate (Maddrell salt) may likewise be rendered soluble by potassium ion. If a mixture of insoluble alkali-metal metaphosphates is added to the fruit product, a mutual solubilizing action takes place. The insoluble alkali-metal metaphosphates are also solubilized by acid, so that they could be dissolved before adding to the fruit product to be treated.

Where glassy molecularly dehydrated phosphates are employed, I may use not only phosphate glasses containing one or more alkali-metal oxides, but also those in which some of the alkali-metal oxide has been replaced by bivalent metal oxides, such as calcium oxide or magnesium oxide, or by trivalent metal oxides, such as aluminum oxide.

A. TREATMENT OF TOMATO PRODUCTS

It is well known that practically all cooked red fruits undergo a pronounced change in color after they have been packed. It is generally conceded that certain chemical reactions with the tannins present are responsible for the change in color of the product. This change is more pronounced when certain metals and metal salts, particularly iron and iron salts, come in contact with the tannins during the cooking process or after the product is packed. Although the color change is not always immediately noticeable, after the fruit is packed a darkening may occur during storage.

While I have found that a darkening of many cooked red fruits is apparent even to the unskilled observer, the problem is particularly acute in the case of tomato products, especially catsup. The results of my process are more striking when I treat tomatoes in the processing of catsup than in any of the other tests I have conducted.

Campbell's Book, revised edition published in 1937 and written by Clyde H. Campbell, former chemist in the Department of Agriculture of Pennsylvania, devotes a number of pages to a discussion of tomato products. On page 473, a comprehensive treatment of the processing of tomato catsup is presented. Campbell defines tomato catsup as "the concentrated product made from the pulp and juice of ripe tomatoes (exclusive of skins, seeds, and cores), a vinegar, salt, spice, and other seasoning, sugar and/or dextrose."

Catsup is usually made by concentrating the tomato pulp of about 4.5–5.0% total solids from 120 gallons to 55 gallons finished catsup or a concentration of approximately 2 to 1. The consistency of catsup may vary from a thin to a very thick fluid. Catsup may be manufactured from tomato pulp which is produced by either the hot pulp or cold pulp method. Both processes have advantages and disadvantages, and it is largely a matter of personal opinion and judgement as to which gives superior results.

In the cold pulp method, the washed and sorted tomatoes are scalded to loosen the skins and run through a grater to disintegrate them. The tomatoes are then run through a pulping machine which removes stems, skins, seeds, coarse fiber and scar tissue. If desired, a "catsup finisher" may be employed. This operation removes any small seeds and fiber not taken out by the pulper itself. Since the cold pulp method does not utilize steam, which may contain some dissolved iron from the steam line, it is quite probable that discoloration of the catsup produced from cold-pulped tomatoes is not as much of a factor as in catsup prepared from hot-pulped tomatoes. However, if any stems are present in the finished pulp or if the pulp contains an appreciable amount of unripened pulp, the concentration of tannin will be increased and subsequent cooking may cause discoloration. The yield in cold pulping is not quite as high as in hot pulping, but the color is equally good and the flavor is thought to be superior.

In the hot pulp method, the tomatoes, either chopped or whole, are conveyed into glass-lined steel or cypress tanks holding 500–1000 gallons. These tanks are equipped with open steam lines and as soon as the pipes are covered with tomatoes, the steam is turned on and cooking is continued until all the tomatoes are disintegrated, after which they are run through two cyclone machines equipped with coarse and fine screens. One objection to the hot pulp method is that the introduction of either dissolved iron present in the steam and water, or the introduction of iron in the form of scale, may cause darkening of the product. It follows that the more iron and tannin present the greater the discoloration of the catsup.

Whether the pulping is done by either the hot or cold method, the pulp is cooked in kettles to reduce the bulk by evaporation to approximately one-half of its original volume. One-half hour is usually sufficient and forty-five minutes is the maximum time allowable for cooking at atmospheric pressure. Temperatures rarely exceed 212° F. at atmospheric pressure but when cooking under vacuum a temperature of 130° F.–140° F. with a vacuum of 27–28 inches of mercury is preferred. Excessive temperatures and excessive cooking time result in a less pleasing taste and a darker color.

To the tomato pulp are added the various ingredients present in practically all formulae for catsup. Although the ingredients will vary depending upon the manufacturer, catsup essentially contains tomato pulp, sugar, salt, vinegar, and spices. When whole spices are used they are generally placed in a cloth bag and suspended in the pulp where the flavor is extracted from them. A typical formula is given by Campbell on page 487 of his book:

| Ingredient | Unit | Amount |
|---|---|---|
| Tomato pulp, sp. gr. 1.020 | gal | 330 |
| Sugar | lb | 120 |
| Salt | lb | 27 |
| Vinegar 100 grain (white distilled) | gal | 7 |
| Cloves (headless) | oz | 15 |
| Cinnamon (sifted) | oz | 15 |
| Mace | oz | 1 |
| Cayenne pepper | oz | 5 |
| Garlic | oz | 25 |

Tannin may be introduced into the catsup by several of the ingredients which are added to the pulped tomatoes, i. e. vinegar and spices. As spices usually contain large quantities of tannin, this remains in the finished product and may react with metallic ions present in the catsup after cooking, thereby causing a gradual darkening of the product. Cinnamon, cloves, and allspice contain a particularly large percentage of tannin and in some establishments, the more expensive spice oils are substituted in an effort to avoid the objectionable effects of tannin. Many manufacturers would prefer to use whole spices due to their lower cost and better flavoring qualities, but because these contain objectionable tannin, they have been obliged to use the more expensive spice oils.

One of the major sources of discoloration is the cap which seals the catsup bottle. Cork liners are widely used in the bottle caps, and since high quality cork is not always obtainable, most of the available cork has minute pinholes which contain finely divided cork dust high in tannin. Some of this dust may be drawn onto the surface of the catsup in the neck of the bottle during the cooling process since a vacuum is formed in the bottle. The tannin reacts with iron present in the catsup and causes the familiar "black neck" which is a pronounced darkening of the catsup at the top of the bottle.

Although the color of catsup in the top of the bottle neck rarely becomes black in the true sense of the word as long as the bottle remains unopened, there is a pronounced darkening and the original brilliant red may change to a reddish-brown or even a dark brown. Since practically all catsup is packed in glass and the purchaser has full opportunity to inspect the product, "black neck" is a definite objection even though the edibility of the catsup may not be impaired. In many establishments a paper label is affixed to the neck of the bottle to cover the uppermost portion of the catsup, where "black neck" develops, presumably to hide this discoloration from the purchaser. However, even though this practice may be effective in preventing consumer rejection at place of sale, the darkening of the catsup will often be discovered after the bottle is opened.

When catsup containing iron and tannin is oxidized through exposure to air by the introduction of air due to defective sealing of the bottle, "black neck" will develop more rapidly and a darker color will become apparent. Opened catsup bottles which frequently stand uncovered for long periods of time absorb considerable oxygen from the air and blackened catsup at the mouth of the bottle is a familiar and undesirable sight.

While I have confined my discussion to catsup, chili sauce is also subject to discoloration; "black neck," to a somewhat lesser extent, is also a problem in the production of this food product.

A typical molecularly dehydrated phosphate which may be employed in the treatment of tomato catsup is a sodium phosphate glass having a ratio of $Na_2O:P_2O_5$ of approximately 1.1:1. This product is commercially available and it was chosen as being typical of the phosphates which I can use in practicing my invention.

I divided a batch of about 60 lbs. of quartered fresh tomatoes into two parts; to one I added one ounce of glassy phosphate before cooking; nothing was added to the other. Both batches were cooked until soft and were then passed through pulping screens to remove all seeds and rag. I used approximately 12 quarts of the screened pulp or juice in preparing two separate batches of catsup. Each batch consisted of the following ingredients:

| Ingredient | Unit | Amount |
|---|---|---|
| Tomato pulp or juice | qt | 12 |
| Sugar | lb | 2 |
| Salt | oz | 5 |
| 100 grain vinegar | pt | 1 |
| Ground onion | oz | 6 |
| Broken cinnamon | gm | 3 |
| Headless cloves | gm | 2 |
| Paprika | gm | 1 |
| Cayenne pepper | pinch | |

In preparing the catsup I used a kettle having a capacity of approximately 24 quarts. I added about one-half of the batch of juice or approximately 6 qts. to the kettle, and when the juice started to boil, I added about ⅓ to ½ of the weight of sugar by scattering it over the top of the boiling juice. All of the spices except the Cayenne pepper were placed in a cloth bag which was hung over the edge of the kettle so that the cooking catsup would extract the flavoring from the various spices. The pepper was added direct to the batch. The balance of the tomato juice was added slowly so that the boiling was not checked to any great extent.

When the juice was condensed to about ½ of its original volume, I added the rest of the sugar. I added the salt and one pint of 100 grain vinegar when the volume had condensed to five quarts. The batch was cooked a few more minutes and then bottled.

I discovered that the color of the batch containing phosphate was considerably redder than that of the untreated batch. In addition, I noticed that the treated batch seemed to cook more rapidly and had more body. Both the greater body and the accelerated cooking may be due to the more rapid and complete extraction of pectin in situ from the cell walls of the tomatoes resulting from the addition of phosphate prior to the cooking process.

From the foregoing example, it can readily be seen that the treatment of tomatoes for catsup manufacture offers sufficient advantage to outweigh the slight added cost of material since the amount of phosphate actually used in the process was about ¼ of 1% based on the weight of tomatoes from which the catsup was manufactured.

To observe the formation of "black neck," I prepared several bottles of catsup from the two batches which have been described. After bottling the product, I retained the samples for a number of months. A bottle of high quality commercial catsup which exhibited no darkening at the top of the bottle when purchased was placed in storage along with the other samples for comparison. After several months, the treated samples showed no darkening in the neck of the bottle, whereas the untreated samples and the commercial product had developed a pronounced dark brown color at the top of the bottle. I opened a treated bottle and an untreated bottle and used each sample intermittently over a period of weeks to observe the formation of dark deposits on the cork-lined metal caps used for sealing the samples. I noted that the untreated catsup in contact with the cork and the metal cap developed a black color whereas the color of the treated product remained a natural red.

I have also found phosphate treatment of value in processing certain dehydrated tomato products. When these products are reconstituted they no longer have a pronounced red color but are brown. The glassy phosphate as used in catsup was found to impart the same color stabilizing effect to dehydrated tomato paste and dehydrated catsup. Not only does the phosphate improve the color of dehydrated tomato products but it aids in their rapid reconstitution with water.

The various molecularly dehydrated phosphates which I have described may be used to advantage in treating such tomato products as tomato juice, tomato paste, and solid pack tomatoes. The preservation of natural red color would be noticeable in treating any of these tomato products. By using some of the solubilized water-insoluble phosphates such as solubilized crystalline potassium metaphosphate, an improved tomato juice could be obtained. The solubilized $KPO_3$ being quite viscous will retard sedimentation of solid tomato particles present in the juice and will increase the viscosity of the product in addition to stabilizing the natural red color.

B. BERRY PRODUCTS

The preservation of the natural red color of many berry products may also be accomplished by the practice of my invention. The darkening of jams, jellies, and preserves is believed to be due to the same chemical reactions which cause the darkening of tomato products, although this color change may not develop as rapidly. I have found that the addition of certain molecularly dehydrated phosphates to various berry products prior to the cooking process inhibits the usual darkening of the fruit. By conducting various tests in groups, using the untreated product as a blank for comparative purposes, the preservation of natural color and the improvement of other qualities are quite marked.

1. STRAWBERRY PRESERVE

Strawberry jams and preserves exhibit a more pronounced change in color after cooking than do other berry products. Although after packing, the product may appear to be quite red, there is a marked darkening during cooking and the preserved strawberries no longer have the brilliant red color of the uncooked fruit. In addition the color of the fruit during storage gradually changes from dark red to a reddish-brown that becomes darker over a period of time.

By the addition of small amounts of molecularly dehydrated phosphate to the strawberries prior to cooking, I am able to produce a finished preserve, the color of which is redder than that of an untreated preserve which is used for color comparison. In preparing a treating solution, I dissolved 30 gm. of a sodium phosphate glass having a ratio of $Na_2O:P_2O_5$ of 1.1:1 in 100 cc. of water and to each of several batches of uncooked strawberries I added different amounts of solution. The amount of sugar used and the length of cooking time were identical for each batch.

Table I

*Batch No. 1.*—Control. No phosphate added. Color dark red, seeds showed signs of discoloration.

*Batch No. 2.*—2 cc. phosphate solution (0.1% by weight) added for each pound of fruit. Color superior to control sample. Jelly strength good and setting rapid enough for commercial practice.

*Batch No. 3.*—3 cc. phosphate solution (0.15% by weight) added for each pound of fruit. Color bright red, superior to control sample and Batch No. 2, no discoloration of seeds, jelly strength good and rapid setting time apparent.

*Batch No. 4.*—4 cc. phosphate solution (0.2% by weight) added for each pound of fruit. Color reddish pink and jelly slow in setting.

This series of tests definitely indicates that the addition of a molecularly dehydrated phosphate yields an improved natural red color, prevents darkening of the seeds, and improves the gel forming qualities of strawberries.

2. RED RASPBERRY PRESERVE

Similar tests were conducted using a solution of 30 gm. of a sodium phosphate glass having a ratio of $Na_2O:P_2O_5$ of 1.1:1 to treat red raspberries prior to preserving.

Table II

*Batch No. 1.*—Control. No phosphate added. Color very dark, jelly strength good, seeds darkened.

*Batch No. 2.*—2 cc. phosphate solution (0.1% by weight) added for each pound of fruit. Color slightly less dark than control but seeds show signs of darkening. Good gel strength.

*Batch No. 3.*—3 cc. phosphate solution (0.15% by weight) added for each pound of fruit. Color lighter than Batches 1 or 2, seeds not discolored, good gel strength.

*Batch No. 4.*—4 cc. phosphate solution (0.2% by weight) added for each pound of fruit. Color superior in brightness to Batches 1, 2, and 3. Seeds remain light. Good jelly strength.

*Batch No. 5.*—8 cc. phosphate solution (0.4% by weight) added for each pound of fruit. Excellent color. This sample superior in all respects to the others.

These tests indicate that color preservation is obtained when raspberries are treated with a molecularly dehydrated phosphate prior to cooking, although higher concentrations of phosphate are required to obtain a maximum inhibition of the darkening in color than in the case of preserved strawberries.

3. CRANBERRY SAUCE

I have found that the addition of a molecularly dehydrated phosphate to cranberries improves not only the color, gel strength, and yield of the final product but also the taste. Quite often cranberry sauces and jellies have a pronounced bitter flavor.

In preparing a standard cranberry sauce I added 1 lb. water to 2.5 lb. washed cranberries, cooked until soft and passed the fruit through a hand puree and seed-separating device. The resulting puree was cooked with 2.25 lb. sugar to 219° F. Before the initial cooking process, I added to each of three batches of fruit varying amounts of a glassy sodium phosphate having a ratio of $Na_2O:P_2O_5$ of 1.1:1.

Table III

*Batch No. 1.*—Control. No phosphate added. This match was quite hard after preliminary cooking and the preparation of a puree was somewhat difficult.

*Batch No. 2.*—1 gm. phosphate (0.2%) added to each pound of raw fruit. Pulping and seeding more quickly accomplished than with untreated batch. Yield of puree somewhat greater than in Batch No. 1.

*Batch No. 3.*—2 gm. phosphate (0.4%) added to each pound of raw fruit. Improved pulping and seeding noted. Yield greater than Batch No. 1 or Batch No. 2.

*Batch No. 4.*—4 gm. phosphate (0.8%) added to each pound of raw fruit. Additional improvement in yield, pulping and gel strength.

I noticed that as the phosphate content of each batch was increased, the beneficial results became more noticeable. The distasteful bitterness of the control sample was unnoticeable in the treated samples. While improvement in the color of cranberry source is not as noticeable as in the case of tomatoes, strawberries, and raspberries, there is a better retention of natural redness in the samples to which phosphate is added than in the untreated sample.

While I have described the treatment of only a few red fruits and have pointed out the material advantages obtained by the use of my process, it is obvious that many other fruits can be improved by the practice of my invention. Cherries, blackberries, currants, loganberries, gooseberries, and elderberries are representative fruits which may be treated by my process.

What I claim as new and desire to secure by Letters Patent is:

1. The method of treating red fruit which comprises adding to the fruit prior to cooking a water-soluble molecularly dehydrated phosphate in amount sufficient to stabilize the natural red color of the cooked fruit.

2. The method of treating red fruit which comprises adding to the fruit prior to cooking a water-soluble alkali-metal phosphate glass having a ratio of $M_2O:P_2O_5$ in the range of from about 0.8:1 to about 1.7:1, the amount of said phosphate being such as to preserve to a large extent the natural red color of the fruit and prevent a darkening of the cooked fruit.

3. The method as described in claim 2 in which the water-soluble alkali-metal phosphate glass is a sodium compound.

4. The method of treating red fruits including tomatoes by which natural red color is retained, which comprises adding effective amounts of a crystalline water-insoluble sodium metaphosphate and a crystalline water-insoluble potassium metaphosphate to the fruits prior to the cooking process.

5. The method of treating a quantity of red fruits including tomatoes whereby to the uncooked fruit an amount of alkali-metal molecularly dehydrated phosphate in the range of from 0.05% to 5.0% by weight based on the weight of raw fruit is added prior to cooking, and cooking, thereby yielding a product the red color of which is less dark than the color of a corresponding quantity of the same fruit to which said phosphate has not been added.

6. The method of retarding the darkening of tomato catsup which comprises adding to the tomato pulp prior to cooking an amount of an alkali-metal molecularly dehydrated phosphate greater than 0.05% of the weight of the uncooked pulp but less than 5% of the weight of the pulp, adding flavoring ingredients and cooking the pulp for the required length of time.

7. The method as described in claim 6 wherein the alkali-metal molecularly dehydrated phosphate is an alkali-metal phosphate glass having a ratio of $M_2O:P_2O_5$ in the range of from 0.8:1 to about 1.7:1.

8. The method of retarding degradation of the natural red color after packing of preserved fruits which comprises adding to the washed and cleaned fruit prior to cooking with sugar at least 0.05% by weight of an alkali-metal molecularly dehydrated phosphate based on the weight of the raw fruit, and cooking the fruit for the required length of time.

9. The method as described in claim 8 wherein the alkali-metal molecularly dehydrated phosphate is an alkali-metal phosphate glass having a ratio of $M_2O:P_2O_5$ in the range of from 0.8:1 to 1.7:1.

10. The method of preventing the formation of "black neck" in tomato products containing tomatoes, vinegar, and spices which consists in adding to the tomatoes prior to cooking a molecularly dehydrated phosphate in an amount within the range of from 0.05% to 5.0% based on the weight of the uncooked tomatoes, and then cooking the tomatoes.

11. The method as described in claim 10 wherein the molecularly dehydrated phosphate is an alkali-metal phosphate glass.

12. The method as described in claim 10 wherein the molecularly dehydrated phosphate is a sodium phosphate glass.

13. The method of treating red fruits and tomatoes which comprises adding to the same prior to cooking a molecularly dehydrated crystalline phosphate in amount sufficient to stabilize the natural red color of the fruit and prevent the excessive darkening of the fruit after the cooking process, and then cooking the fruits and tomatoes.

14. A cooked tomato product containing more than 0.05% by weight but less than 5% by weight of an alkali-metal molecularly dehydrated phosphate.

15. An improved red fruit product containing from 0.05 to 5.0% by weight of a molecularly dehydrated crystalline phosphate.

16. A product according to claim 15 characterized by the fact that the phosphate is an alkali-metal phosphate glass.

17. A product according to claim 14 characterized by the fact that the phosphate is an alkali-metal phosphate glass.

18. A product according to claim 15 characterized by the fact that the phosphate is a solubilized water-insoluble alkali-metal crystalline metaphosphate.

19. A product according to claim 14 characterized by the fact that the phosphate is a solubilized water-insoluble alkali-metal crystalline metaphosphate.

20. The method of treating red fruit which comprises adding to the fruit prior to cooking a water-soluble alkali-metal crystalline pyrophosphate, the amount of said phosphate being such as to preserve to a large extent the natural red color of the fruit and prevent a darkening of the cooked fruit.

21. The method as described in claim 20 in which the phosphate is a crystalline acid pyrophosphate.

22. A method of treating red fruit which comprises adding to the fruit prior to cooking a water-soluble alkali-metal crystalline tripolyphosphate, the amount of said phosphate being such as to preserve to a large extent the natural red color of the fruit and prevent a darkening of the cooked fruit.

23. A method of treating red fruit which comprises adding to the fruit prior to cooking a crystalline metaphosphate, the amount of said phosphate being such as to preserve to a large extent the natural red color of the fruit and prevent a darkening of the cooked fruit.

GEORGE O. HALL.

REFERENCES CITED

The following references are of record in the file of this patent:

UNITED STATES PATENTS

| Number | Name | Date |
|---|---|---|
| 1,966,927 | Fiske | July 17, 1934 |
| 2,305,263 | Latshaw | Dec. 15, 1942 |

FOREIGN PATENTS

| Number | Country | Date |
|---|---|---|
| 266,069 | Great Britain | Feb. 24, 1927 |
| 536,920 | Great Britain | May 30, 1941 |

Certificate of Correction

Patent No. 2,478,266 　　　　　　　　　　　　　　　　　　　　August 9, 1949

GEORGE O. HALL

It is hereby certified that errors appear in the printed specification of the above numbered patent requiring correction as follows:

Column 8, line 4, for the word "match" read *batch*; line 24, for "source" read *sauce*; and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*